(12) United States Patent
Asente

(10) Patent No.: US 6,522,328 B1
(45) Date of Patent: Feb. 18, 2003

(54) APPLICATION OF A GRAPHICAL PATTERN TO A PATH

(75) Inventor: Paul J. Asente, La Honda, CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,504

(22) Filed: Apr. 7, 1998

(51) Int. Cl.⁷ .............................................. G06T 11/20
(52) U.S. Cl. .......................... 345/441; 345/442; 345/636
(58) Field of Search ................................. 345/441, 442, 345/443, 433, 435, 629, 636, 619, 672, 674, 648, 635

(56) References Cited

U.S. PATENT DOCUMENTS

| | | | | |
|---|---|---|---|---|
| 4,975,860 A | * | 12/1990 | Kitaya et al. | 364/520 |
| 5,467,443 A | * | 11/1995 | Johnson et al. | 395/141 |
| 5,717,848 A | * | 2/1998 | Watanabe et al. | 395/174 |
| 5,821,925 A | * | 10/1998 | Carey et al. | 345/331 |
| 5,831,632 A | * | 11/1998 | Schuster et al. | 345/441 |

OTHER PUBLICATIONS

Microsoft Powerpoint 97 SR–2.—relevant help pages.*
Inside Adobe Photoshop 4 Limited Edition (Chapter 4: pp 155–164), 1996.*
Richard Spohrer, "Expression, Graphics Software," U.S. Macworld reviews, 3 pgs., downloaded from www.uk.macworld.com., Nov. 1996.

* cited by examiner

Primary Examiner—Mano Padmanabhan
(74) Attorney, Agent, or Firm—Fish & Richardson P.C.

(57) ABSTRACT

Methods and apparatus implementing a technique for applying a graphical pattern to a path. The technique includes defining a path for display in an electronic document and defining a repeatable graphical pattern. The technique also includes repetitively placing instances of the repeatable graphical pattern along the path to form a continuous pattern which conforms to the path, determining whether a geometry of the path changes and automatically reapplying instances of the repeatable graphical pattern to the path if the geometry of the path changes.

32 Claims, 10 Drawing Sheets

APPLICATION OF A GRAPHICAL PATTERN TO A PATH

BACKGROUND OF THE INVENTION

The invention relates generally to methods and systems for creating computer generated images.

Applying a graphical pattern along a user-defined path may involve the use of pattern cells. A pattern cell is simply a graphical pattern of a predetermined size. A user may select a pattern cell from a multitude of previously defined pattern cells made available to the user by a drawing application. Alternatively, a pattern cell may be constructed (e.g., drawn) by a user.

In modern drawing programs, such as Adobe Illustrator® produced by Adobe Systems Incorporated, of San Jose, Calif., graphical patterns are a common feature. A user may select a graphical pattern and manually apply copies of the selected graphical pattern wherever desired on a drawing. For example, the user may desire to place a graphical pattern along a path, e.g, as shown in FIG. 4. Conventional drawing programs require the user to select a graphical pattern and then individually place multiple copies of the pattern along the path.

This approach requires a great deal of user time to individually place the graphical patterns so as to form a graphical patterned shape, e.g., as shown in FIG. 5. Also, when the graphical pattern is to be placed on a curved line or around a corner, a user may have great difficulty in getting the graphical pattern to follow the curve or corner in a graphically pleasing manner. A user may modify the individual graphical patterns to fit a curved line or corner. However, the modification of individual graphical patterns is difficult and time consuming.

An improved technique for placing graphical patterns along paths or shapes such that graphically pleasing paths or shapes can be produced with only a minimal amount of user time is described in the commonly-owned copending U.S. Pat. application entitled "Automatic Graphical Pattern Placement", to Michael D. Schuster et al, Ser. No. 08/580, 472, filed Feb. 9, 1998 which is hereby incorporated by reference.

SUMMARY OF THE INVENTION

In general, the invention relates to a graphical pattern placement technique performed automatically on an electronic document. Initially, a path on an electronic document is defined and a graphical pattern to be placed on the path is selected. The graphical pattern may be applied along the path by a programmed computer such that the graphical pattern follows the orientation and curvature of the path. The application of the graphical pattern may include placement of a special graphical pattern along corners or edges of the path. If the path is changed, the graphical pattern is automatically replaced along the changed path such that the graphical pattern follows the orientation and curvature of the new path. The automatic replacement of the graphical pattern may include placing special graphical patterns along corners or edges of the path. The invention can be implemented in numerous ways, including as a method, a computer readable medium, or a system.

In general, in one aspect, the invention provides a computer-implemented method for applying a graphical pattern to a path. The method includes defining a path for display in an electronic document, defining a repeatable graphical pattern and repetitively placing instances of the repeatable graphical pattern along the path to form a continuous pattern which conforms to the path. The method also includes determining whether a geometry of the path changes and automatically reapplying instances of the repeatable graphical pattern to the path if the geometry of the path changes.

In general, in one aspect, the invention provides a computer-implemented method for transforming a graphical image having a graphical pattern, instances of which are placed along a path. The method includes determining whether a geometry of the path has changed and automatically placing instances of the graphical pattern along the changed path if the geometry of the path has changed.

Embodiments of the invention may include the following features. The path may be stored and not displayed after the placing of instances of the graphical pattern. The determining of changes may include determining whether the path is selected, displaying the path if selected and detecting changes in the displayed path while selected. The placing of instances of the graphical pattern may include removing the pattern from along the path and placing instances of the graphical pattern along the changed path if the geometry of the path changes. Determining whether a user has requested an update of the continuous pattern and reapplying the graphical pattern only if an update has been requested may be included.

In another aspect, the invention provides a computer-implemented method for applying a graphical pattern to a path and includes selecting a path in an electronic document, selecting a graphical pattern, repetitively placing instances of the repeatable graphical pattern along the path to form a continuous pattern which conforms to the path and storing the path so that the artwork may be changed without having to recreate the path.

Other aspects and advantages of the invention will become apparent from the following detailed description, taken in conjunction with the accompanying drawing, illustrating by way of example the principles of the invention.

DETAILED DESCRIPTION

Graphics applications (i.e., computer programs) may be executed on computer systems. Such applications generally allow a user to create and manipulate images, drawings, and other graphical objects in an electronic document. Such applications generally include tools for translating, rotating and otherwise transforming the objects.

A process for placing a graphical pattern along a path is described below with reference to FIGS. 1–9. The placement of a graphical pattern along a path may include placing a special graphical pattern at any corners or edges of the path. Special graphical patterns, e.g., inner corner cells or outer corner cells, are described in more detail in "Automatic Graphical Pattern Placement", cited above.

Figure 1:
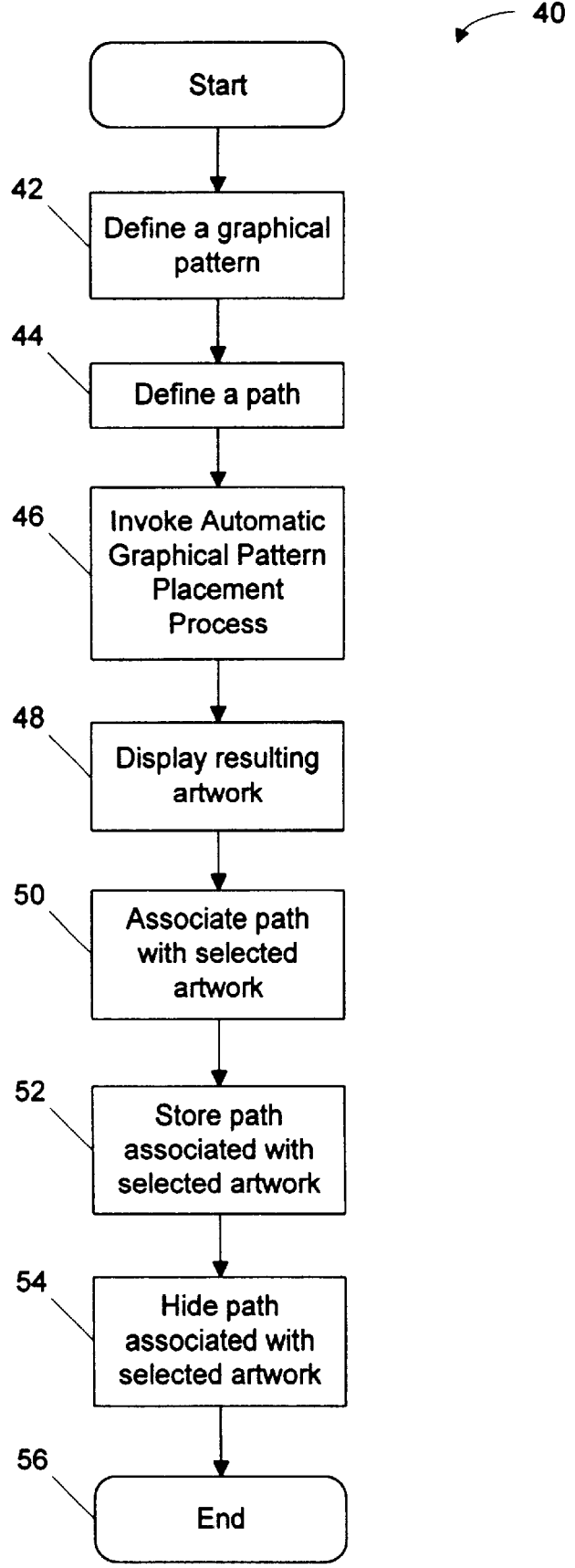
FIG. 1 is a flow diagram of a process for applying a graphical pattern on a path according to the invention.
Figure 3:
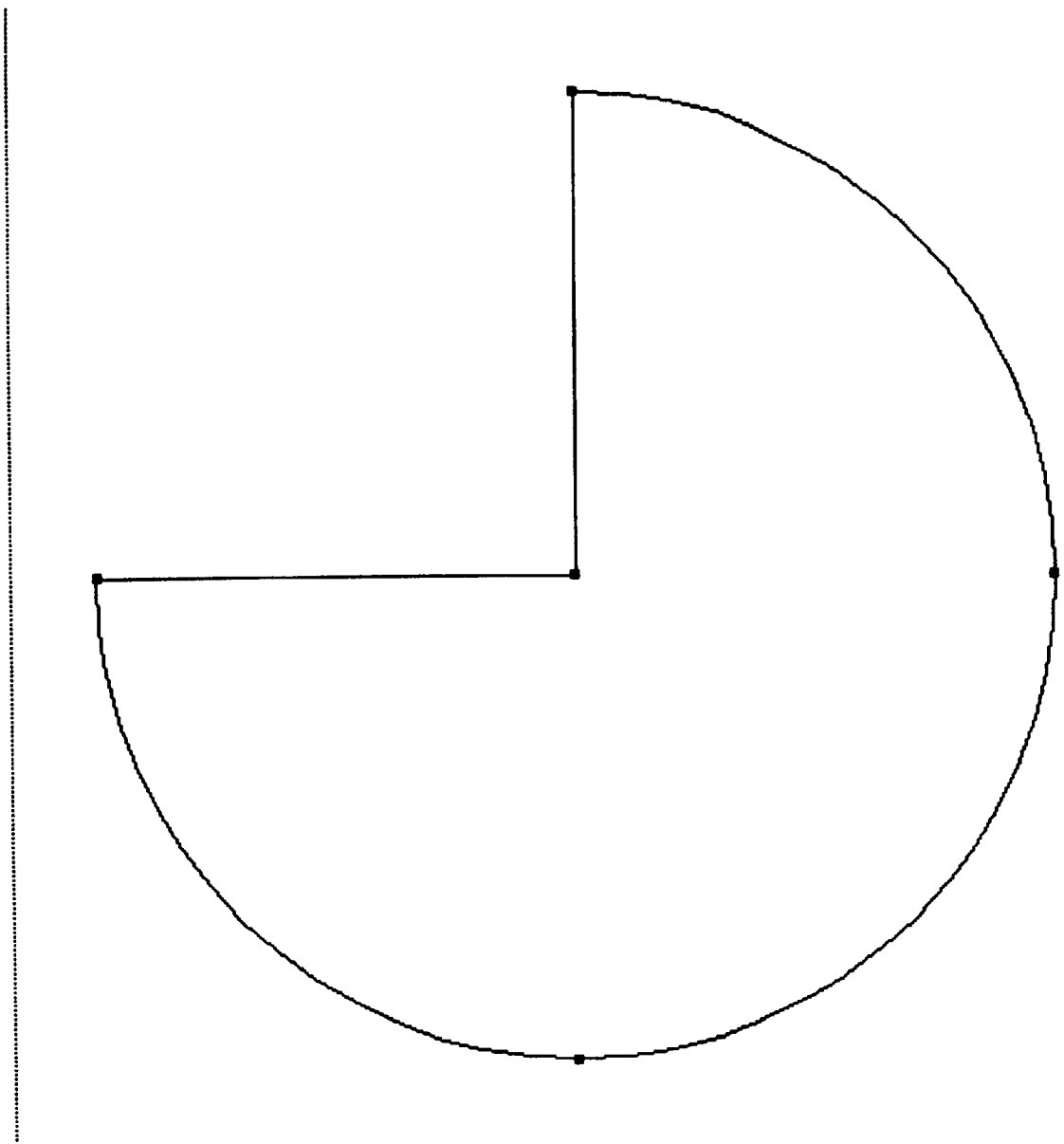
FIG. 3 shows a path displayed on an output device according to the invention.

FIG. 1 is a flow diagram of a process 40 for applying a graphical pattern on a path. A user defines a graphical pattern (step 42) and an original path (step 44), for example as shown in FIG. 3. The graphical pattern may be a single pattern that is desired to be repeated along the path, or alternatively multiple patterns or a sequence of patterns may be selected. The instances of a graphical pattern applied along the path may not be identical thereby allowing for more flexibility in the application of the pattern to corners or along curves to achieve a desired result. A path can be defined by the creation of a path or manipulation of an existing path. The path may be two dimensional and include properties. The path may be expressed as a sequence of points, connected curves or by other similar means.

Figure 4:
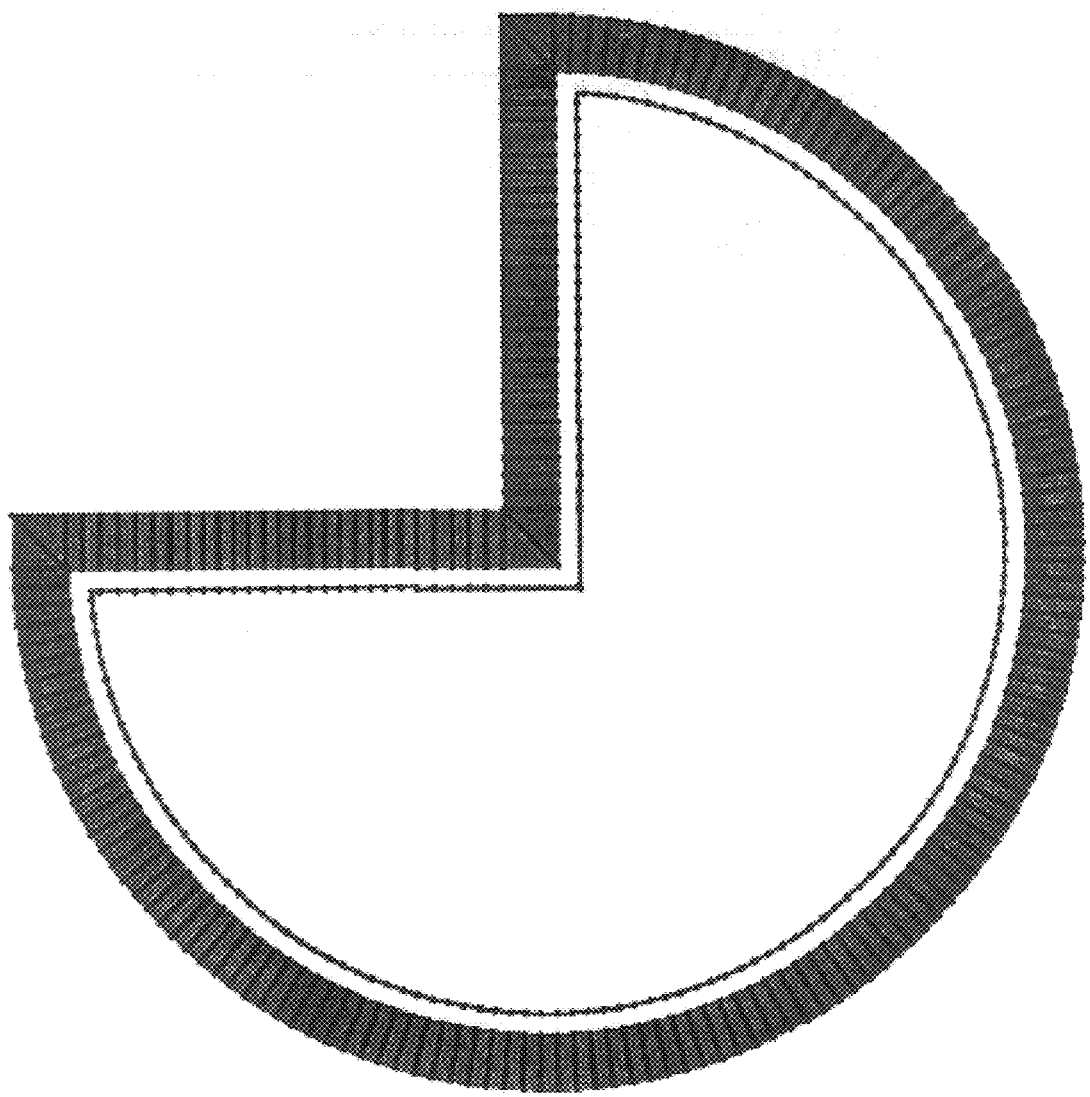
FIG. 4 shows the results of an automatic graphical pattern placement process according to the invention.

The routine invokes an automatic graphical pattern placement process on the original path (step 46) and produces the artwork as shown in FIG. 4 (step 48).

Artwork may be any graphical object (including a raster, vector, or hybrid object) contained within the electronic document. In reference to FIG. 5, artwork refers to the newly produced continuous pattern created by the automatic graphical pattern placement process.

When the graphical pattern is applied to an original path, the path is associated with resulting artwork (step 50) and stored (step 52). The storage of the path may include storage of both path geometry information as well as other properties of the path including color information, path width, corner type or properties derived from a scatter brush. The manipulation of color in association with graphical patterns is described in the commonly-owned copending U.S. Pat. application Ser. No. 09/056,933 entitled "Recoloring Artwork", to Paul J. Asente, filed Apr. 6, 1998, which is hereby incorporated by reference. The use and properties of a scatter brush is described in the commonly-owned copending U.S. Pat. application Ser. No. 09/056,926 entitled "Automatic Graphical Patten Placement and Adjustment", to Paul J. Asente, filed Apr. 7, 1998, which is hereby incorporated by reference.

The stored path is optionally hidden so that only the resulting artwork appears in the document when it is viewed or printed (step 54). Upon display of the resulting artwork, the original path is generally no longer visible. The path may be hidden by superimposing the pattern over the path or by completely removing the path from the display area. When the pattern is superimposed over the path, portions of the path may be visible. The pattern may include holes or other transparent regions at which points the path may be visible.

In one implementation, the automatic graphical pattern placement process is invoked in tandem with path definition. Alternatively, the process may be selectively applied to an existing path by a user command. Once the artwork has been produced the process ends (step 56).

Figure 2:
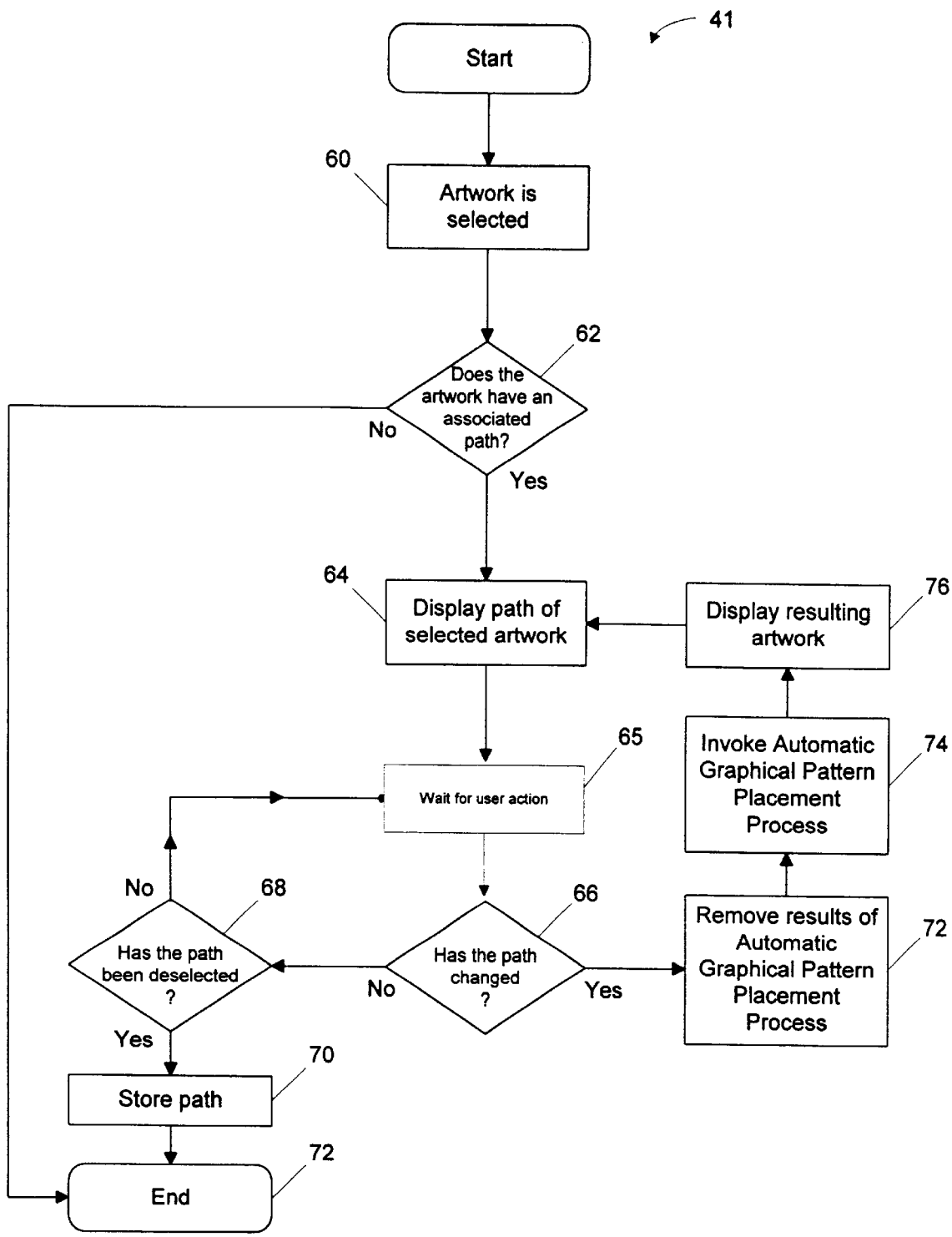
FIG. 2 is a flow diagram of a process for updating a graphical pattern on a path according to the invention.
Figure 5:
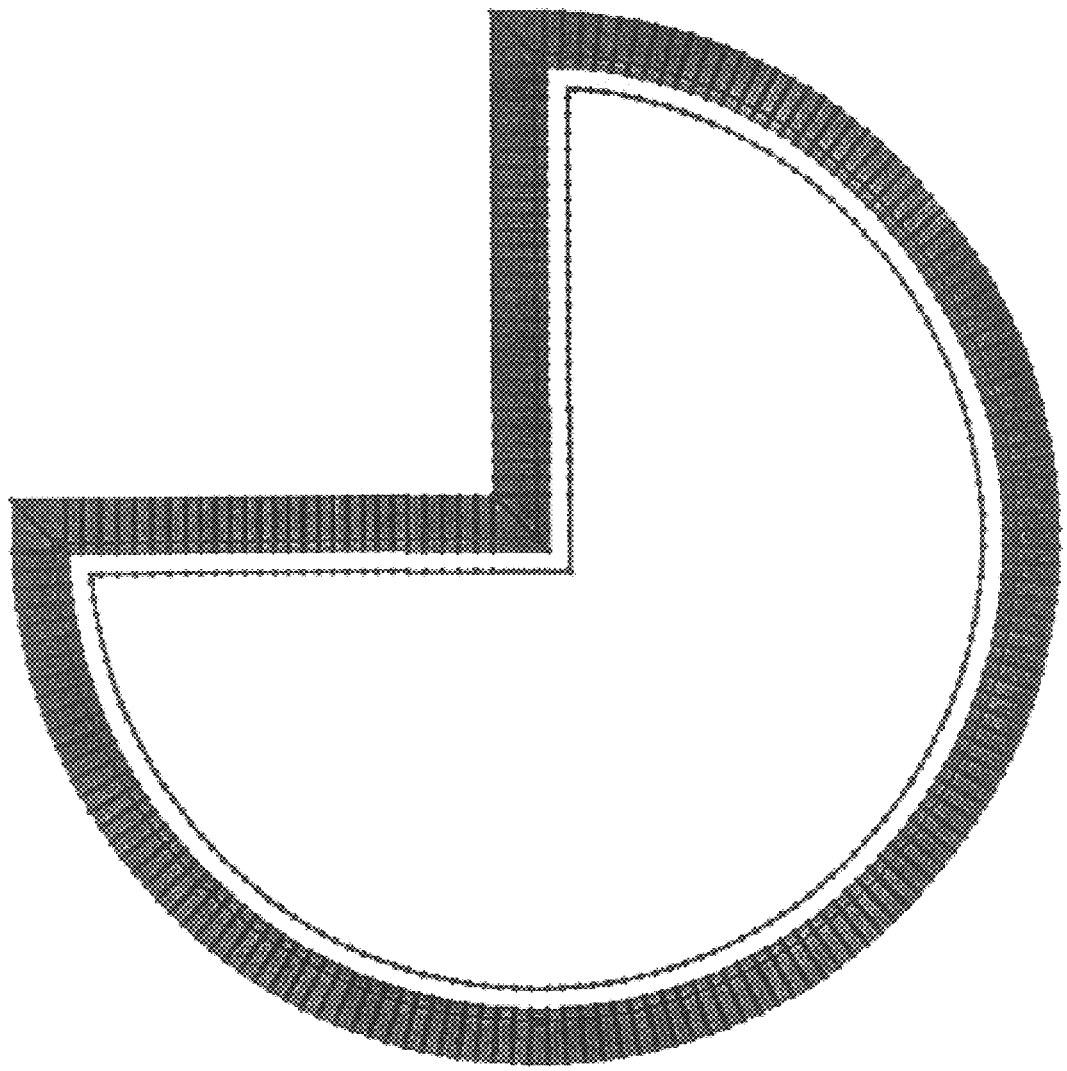
FIG. 5 shows a selected portion of artwork as displayed on an output device according to the invention.

When pre-existing artwork is selected (step 60) by a user through the use of a pointing device, e.g., a mouse, a redefinition process is invoked. Redefinition process 41 first checks if the artwork has a path associated with it (step 62) as shown in FIG. 2. If no path is associated with the artwork, then it may be assumed that the artwork was created by means other than the automatic graphical pattern placement process and the process ends (step 72). When a user selects artwork that includes an associated path, the path associated with the artwork is displayed superimposed over the artwork (step 64). An example is shown in FIG. 5. Once the associated path is displayed, a user may modify the path in any of the ways provided by the application. Examples of modifications include changes to path geometry, color or shading, scale and rotation.

Figure 6:
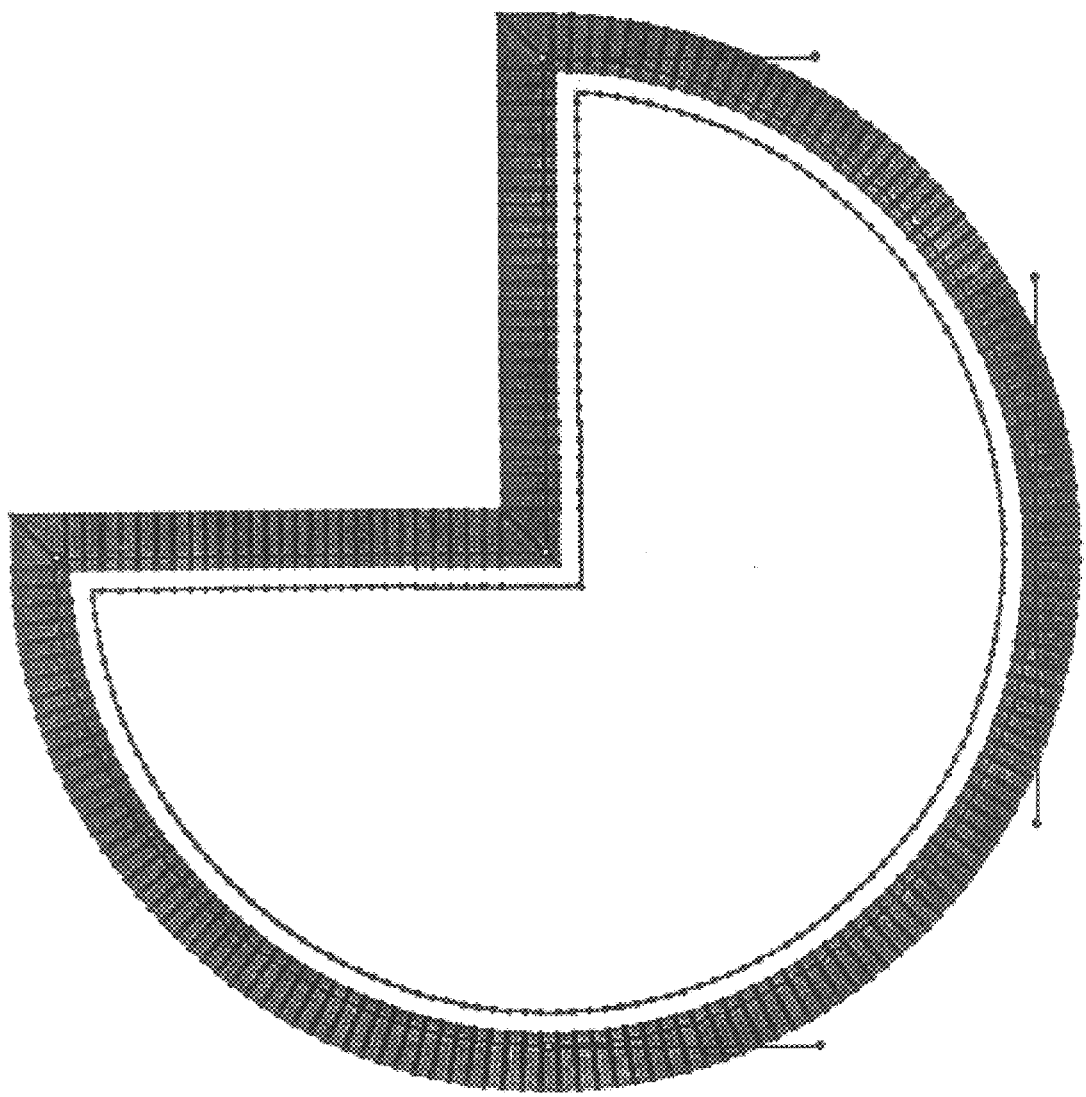
FIG. 6 shows a segment of a path selected for editing as displayed on an output device according to the invention.
Figure 7:
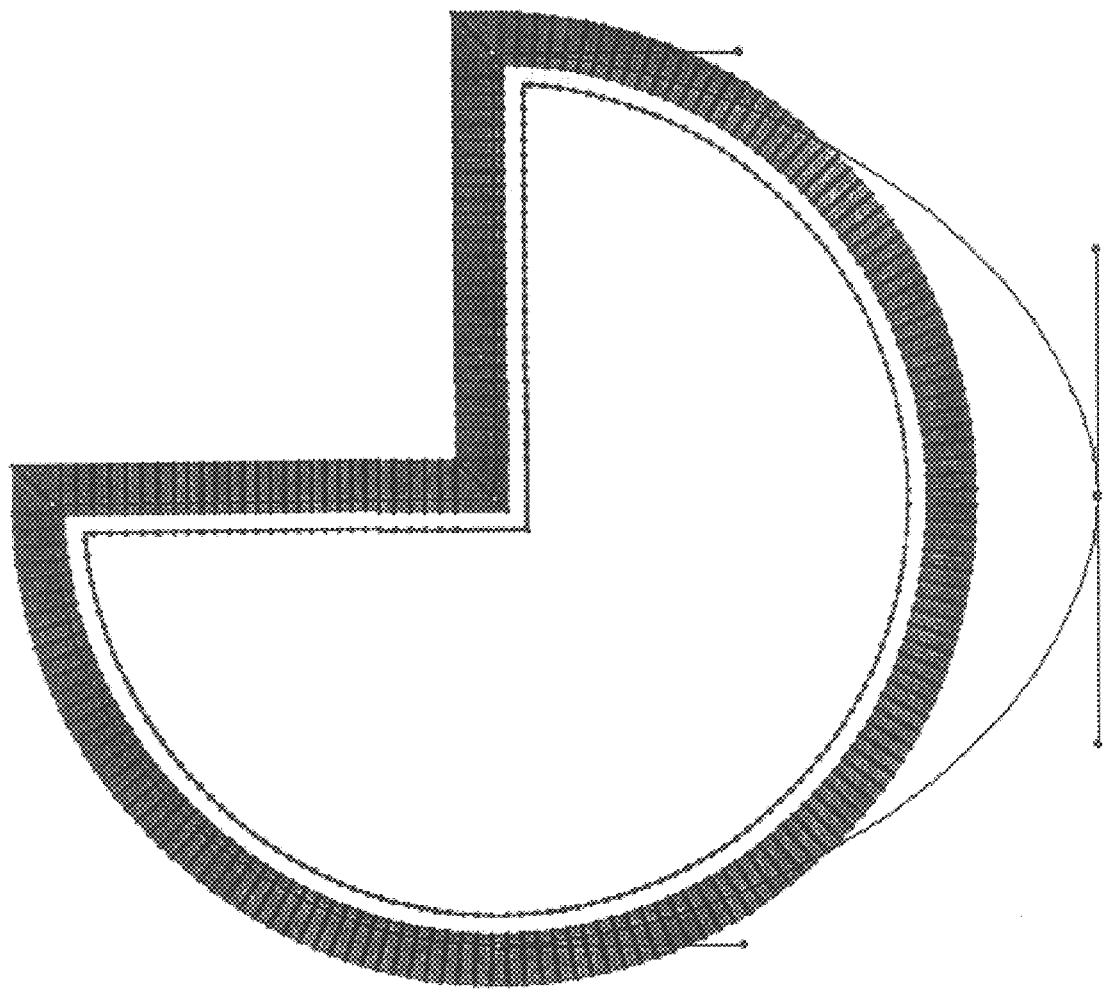
FIG. 7 shows changes in a segment of the path as displayed on an output device according to the invention.
Figure 8:
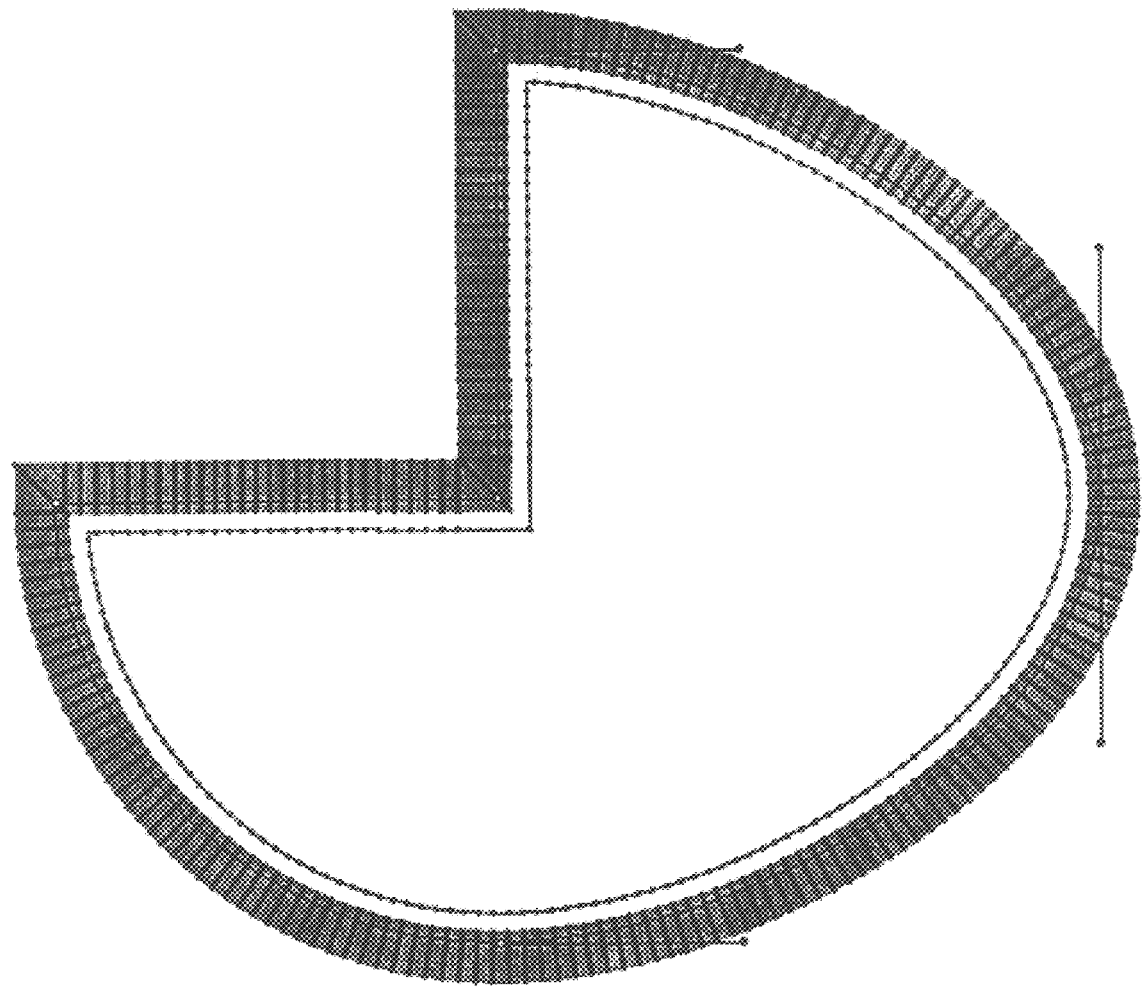
FIG. 8 shows the results of the reapplication of the automatic graphical placement process as displayed on an output device according to the invention.

While a path is selected, the process checks for changes in the shape of the path (steps 65 and 66). If a change is detected, the results of any prior graphical pattern placement process are removed (step 72). Then, the automatic graphical pattern placement process is invoked and a new graphical pattern is applied to the changed path (step 74). The resulting artwork is then displayed (step 76) as before with the selected path superimposed thereon (step 64). Thus, when a user selects a segment of the path for editing, for example, as shown in FIG. 6, and then changes the selected segment of the path, for example, as shown in FIG. 7, the automatic graphical pattern placement process is invoked resulting in the display of the changed artwork, for example as shown in FIG. 8. The new path is associated with the new artwork (step 64).

Alternatively, the routine may wait for a user command to remove the results of the original process and reapply the process to the changed path. In either case, the artwork is produced and may appear displayed with the selected path. So that the user may continue editing, the changed path may remain visible until the user deselects the artwork. A user may deselect a path in two ways, either by selecting another object or performing a task that causes nothing to be selected, e.g., selecting an empty portion of the electronic document's background or selecting a command that deselects objects. Alternatively, the path may be hidden.

Figure 9:
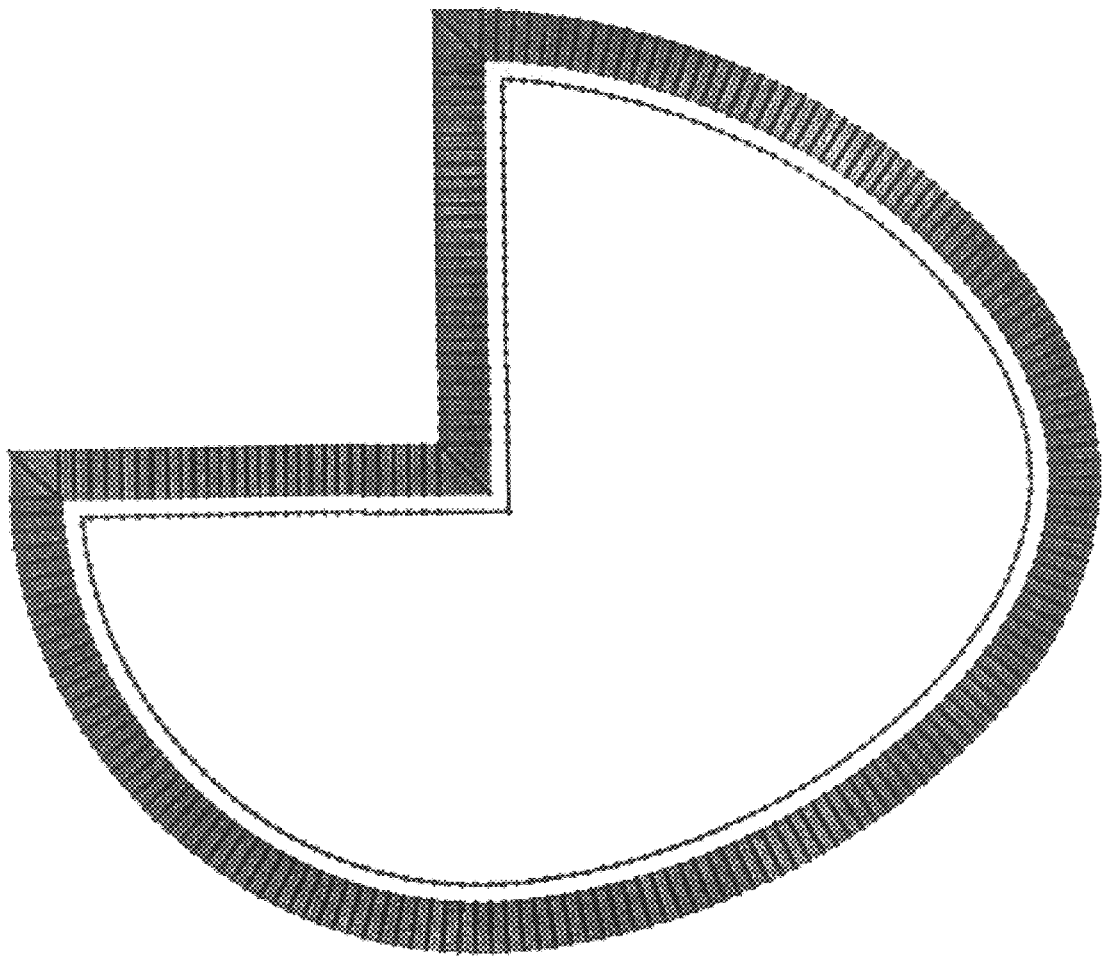
FIG. 9 shows the artwork after deselection as displayed on an output device according to the invention.

A user may modify the path repeatedly; each modification results in replacing the previous artwork for the path with new artwork as a result of the application of the automatic graphical pattern placement process. In one implementation, any modification to the path may result in the replacement of the previous artwork. For example, modifications to the geometry as a result of a scaling operation may result in the removal of the original artwork and the placing of the graphical pattern along the newly defined path. Other modifications that do not change the geometry of the path may still invoke the automatic placement process disclosed herein. After each application of the automatic graphical pattern placement process, the process checks if the path had been deselected (step 68). Once the path is deselected, the process is complete and the resulting artwork is displayed while the source path is hidden, for example as shown in FIG. 9.

When changes have been processed, the routine checks whether the path has been deselected (step 68). Once the path has been deselected, the path is stored (step 70) and the routine ends (step 72). However, if the path has not been deselected, the routine will wait for a user action event (step 65). This loop in the routine continues until either changes are detected (step 66) or deselection occurs (step 68). When the user has finished editing the path and deselects it, or if the user selects something else, the path will be hidden as before.

Alternative Implementations

One implementation includes editing only a portion of a path and thereafter only placing the graphical pattern on the revised portion of the path. The path may be divided into segments and only those segments that have been edited may require the placement of the graphical pattern by the graphical placement process as described above.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. The programmable computer may be part of a printer or display which receives path information and executes the methods disclosed herein to produce a graphical pattern disposed on the path for output on a visual or hard copy display connected to (or at) the output device.

Figure 10:
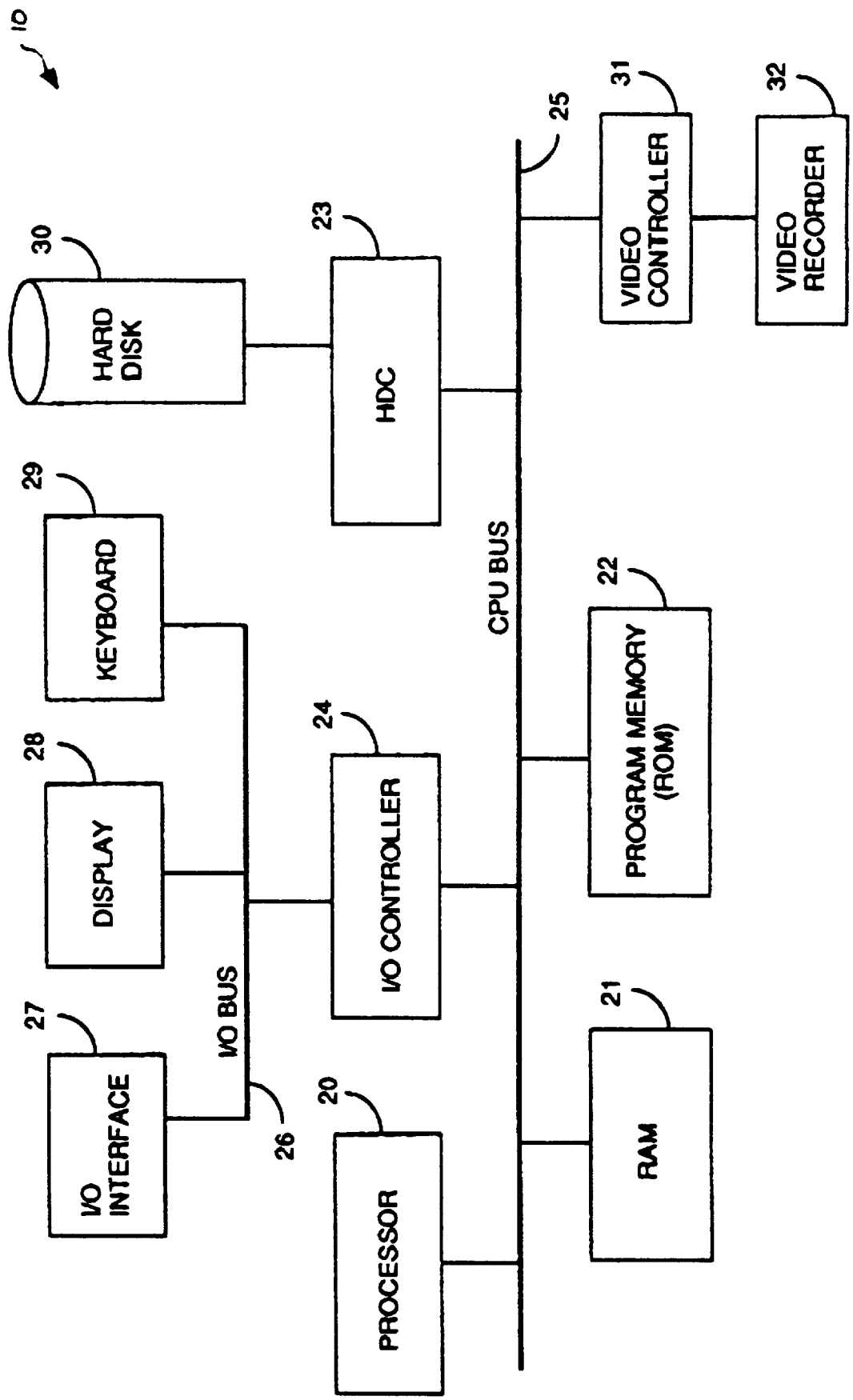
FIG. 10 is a block diagram of an exemplary computer system for automatically placing graphical patterns in accordance with the invention.

By way of example, FIG. 10 shows a block diagram of a programmable information processing system (computer) 10. Computer 10 preferably includes a processor 20, random access memory (RAM) 21, a program memory 22 (preferably a writable read-only memory (ROM) such as a flash ROM) and an input/output (I/O) controller 24 coupled by a CPU bus 25. Computer 10 may optionally include a hard drive controller 23 which is coupled to a hard disk 30 and CPU bus 25. Hard disk 30 may be used for storing application programs, including programs incorporating the present invention, and data. Programs may also be stored in RAM or ROM.

I/O controller 24 is coupled by means of an I/O bus 26 to an I/O interface 27. I/O interface 27 receives and transmits data in analog or digital form over communication links such as a serial link, local area network, wireless link, and parallel link. Optionally, a display 28, a keyboard 29 and a pointing device (such as a mouse) 31 may also be connected to I/O bus 26. Alternatively, separate connections (separate buses) may be used for I/O interface 27, display 28, keyboard 29 and pointing device 31. Computer 10 may be preprogrammed or it may be programmed (and reprogrammed) from another source (e.g., a floppy disk, CD-ROM, or another computer).

Each computer program is tangibly stored in a machine-readable storage medium or device (e.g., program memory 22 or magnetic disk) readable by a general or special purpose programmable computer, for configuring and controlling operation of a computer when the storage media or device is read by the computer to perform the processes described herein. The invention may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A computer-implemented method for applying a graphical pattern to a path, the method comprising:

receiving a user selection of a path in an electronic document;

receiving a user selection of a graphical pattern;

without discarding the path, repetitively placing instances of the graphical pattern along the path to form a first continuous pattern which conforms to the path;

associating the path with the first continuous pattern including storing the path;

determining after the formation of the first continuous pattern whether a geometry of a path segment changes; and automatically placing instances of the graphical pattern along the changed path including the path segment to form a second continuous pattern which conforms to the changed path and associating the changed path with the second continuous pattern including storing the changed path.

2. The method of claim 1, wherein the placement of the graphical pattern results in artwork for display and where the path is stored and not displayed with the artwork.

3. The method of claim 2, wherein the determining step comprises:

determining whether the path is selected;

displaying the path if selected; and detecting changes in a segment of the displayed path while selected.

4. The method of claim 1 wherein the automatically placing step comprises:

removing the continuous pattern previously placed along the path and placing instances of the repeatable graphical pattern along the changed path including the path segment if the geometry of the path segment changes.

5. The method of claim 1, further comprising:

determining whether a user has requested a graphical pattern change; and automatically placing instances of a different graphical pattern along the changed path including the path segment to form a third continuous pattern which conforms to the changed path.

6. A computer-implemented method for transforming a graphical image having instances of a graphical pattern placed along a path to form a continuous pattern, the method comprising:

determining whether a geometry of a path segment has changed including retrieving the path associated with the graphical image;

automatically placing instances of the graphical pattern along the changed path including the path segment if the geometry of the path segment has changed and associating the changed path with the graphical image including storing the changed path; and displaying the instances of the graphical pattern along the changed path.

7. The method of claim 6, wherein the placement of the graphical pattern results in artwork for display and where the path is stored and not displayed with the artwork.

8. The method of claim 7, further comprising:

determining whether the path is selected;

displaying the path if selected; and detecting changes in a path segment of the displayed path while selected to determine whether a geometry of the path segment has changed.

9. The method of claim 6 wherein the automatic placing of instances of the repeatable graphical pattern comprises:

removing the continuous pattern and placing the repeatable graphical pattern along the changed path including the path segment if the geometry of the path segment changes.

10. The method of claim 6 further comprising:

determining whether a user has requested an update of the continuous pattern; and performing the automatic placement step to place the graphical pattern only if an update has been requested.

11. A computer program, tangibly stored on a computer-readable medium, for applying a graphical pattern to a path, the computer program comprising instructions for causing a computer to:

select a path in an electronic document;

select a graphical pattern;

without discarding the path, repetitively place instances of the graphical pattern along the path to form a first continuous pattern which conforms to the path;

associate the path with the first continuous pattern including storing the path;

determine after the formation of the first continuous pattern whether a geometry of a path segment changes; and automatically place instances of the graphical pattern along the changed path including the path segment to form a second continuous pattern which conforms to the changed path and associating the changed path with the second continuous pattern including storing the changed path.

12. The computer program of claim 11 wherein the placement of the graphical pattern results in artwork for display and the computer program further includes instructions for causing a computer to store the path and not display the path with the artwork.

13. The computer program of claim 11 wherein the instructions for causing a computer to determine whether a geometry changes includes instructions for causing a computer to:

determine whether the path is selected;

display the path if selected; and detect changes in a segment of the displayed path while selected.

14. The computer program of claim 11 wherein the instructions for causing a computer to automatically place instances of the repeatable graphical pattern to the path includes instructions for causing a computer to:

remove the continuous pattern previously placed along the path and place instances of the repeatable graphical pattern along the changed path including the path segment if the geometry of the path segment changes.

15. The computer program of claim 11 further including instructions for causing a computer to:

determine whether a user has requested a graphical pattern change; and automatically place instances of a different graphical pattern along the changed path including the path segment to form a third continuous pattern which conforms to the changed path only if a graphical pattern change has been requested.

16. A computer-implemented method for applying a graphical pattern to a path segment, the method comprising:

receiving a user selection of a path segment in an electronic document;

receiving a user selection of a graphical pattern;

without discarding the path segment, repetitively placing instances of the graphical pattern along the path segment to form a continuous pattern which conforms to the path segment, wherein the continuous pattern results in artwork for display;

associating the path segment with the artwork; and storing the path segment after the continuous pattern is formed so that the artwork may be changed without having to recreate the path segment.

17. A computer-implemented method for applying a graphical pattern to a path, the method comprising:

receiving a user selection of a first path in an electronic document;

receiving a user selection of a first graphical pattern;

without discarding the path, repetitively placing instances of the first graphical pattern along the first path to form a first continuous pattern which conforms to the first path;

associating the first path with the first continuous pattern including storing the first path;

determining whether a modification to a geometry of a segment of the first path and the first continuous pattern is required;

receiving a user selection of a second graphical pattern; and automatically placing instances of the second graphical pattern along a second path to form a second continuous pattern which conforms to the second path and associating the second path with the second continuous pattern including storing the second path if a modification is required.

18. The method of claim 17, wherein the first graphical pattern is the same as the second graphical pattern.

19. The method of claim 17, wherein the first graphical pattern is different from the second graphical pattern.

20. The method of claim 17, wherein the geometry of the first path is the same as the geometry of the second path.

21. The method of claim 17, wherein the geometry of the first path is different from the geometry of the second path.

22. A computer program, tangibly stored on a computer-readable medium, for transforming a graphical image having instances of a graphical pattern placed along a path to form a continuous pattern, the computer program comprising instruction for causing a computer to:

determine whether a geometry of a path segment has changed including retrieving the path associated with the graphical image;

automatically place instances of the graphical pattern along the changed path including the path segment if the geometry of the path segment has changed and associate the changed path with the graphical image including storing the changed path; and display the instances of the graphical pattern along the changed path.

23. The computer program of claim 22, wherein the placement of the graphical pattern results in artwork for display and wherein the path is stored and not displayed with the artwork.

24. The computer program of claim 23, further comprising instructions to:

determine whether the path is selected;

display the path if selected; and detect changes in a path segment of the displayed path while selected to determine whether a geometry of the path segment has changed.

25. The computer program of claim 22 wherein the instructions to automatically place of instances of the repeatable graphical pattern comprises instructions to:

remove the continuous pattern and place the repeatable graphical pattern along the changed path including the path segment if the geometry of the path segment changes.

26. The computer program of claim 22 further comprising instructions to:

determine whether a user has requested an update of the continuous pattern; and perform the automatic placement step to place the graphical pattern only if an update has been requested.

27. A computer program, tangibly stored on a computer-readably medium, for applying a graphical pattern to a path segment, the computer program comprising instructions for causing a computer to:

receive a user selection of a path segment in an electronic document;

receive a user selection of a graphical pattern;

without discarding the path segment, repetitively place instances of the graphical pattern along the path segment to form a continuous pattern which conforms to the path segment, wherein the continuous pattern results in artwork for display;

associate the path segment with the artwork; and store the path segment after the continuous pattern is formed so that the artwork may be changed without having to recreate the path segment.

28. A computer program, tangibly stored on a computer-readable medium, for applying a graphical pattern to a path, the computer program comprising instructions for causing a computer to:

receive a user selection of a first path in an electronic document;

receive a user selection of a first graphical pattern;

without discarding the path, repetitively place instances of the first graphical pattern along the first path to form a first continuous pattern which conforms to the first path;

associate the first path with the first continuous pattern including storing the first path;

determine whether a modification to a geometry of a segment of the first path and the first continuous pattern is required;

receive a user selection of a second graphical pattern; and automatically place instances of the second graphical pattern along a second path to form a second continuous pattern which conforms to the second path and associating the second path with the second continuous pattern including storing the second path if a modification is required.

29. The computer program of claim 28, wherein the first graphical pattern is the same as the second graphical pattern.

30. The computer program of claim 28, wherein the first graphical pattern is different from the second graphical pattern.

31. The computer program of claim 28, wherein the geometry of the first path is the same as the geometry of the second path.

32. The computer program of claim 28, wherein the geometry of the first path is different from the geometry of the second path.

* * * * *

UNITED STATES PATENT AND TRADEMARK OFFICE
CERTIFICATE OF CORRECTION

PATENT NO. : 6,522,328 B1
DATED : February 18, 2003
INVENTOR(S) : Paul J. Asente It is certified that error appears in the above-identified patent and that said Letters Patent is hereby corrected as shown below:

Column 8,
Line 36, replace "instruction" with -- instructions --;

Column 9,
Line 6, replace "readably" with -- readable --.

Signed and Sealed this

Twenty-fourth Day of February, 2004

JON W. DUDAS
*Acting Director of the United States Patent and Trademark Office*